3,340,328
BLENDS OF POLYETHYLENES HAVING IMPROVED PROPERTIES
Gordon D. Brindell, Wayne, N.J., and David W. Marshall, Ponca City, Okla., assignors to Continental Oil Company, Ponca City, Okla., a corporation of Delaware
No Drawing. Filed Dec. 13, 1962, Ser. No. 244,296
7 Claims. (Cl. 260—897)

This invention relates to mixtures or blends of polyethylenes displaying certain properties which are superior to the properties displayed by the component polyethylenes in the blend. More particularly, but not by way of limitation, the invention comprises a process for improving the processability of a very high molecular weight, relatively low density, high tensile strength polyethylene by blending with such polyethylene, a second polyethylene having a straight hydrocarbon chain configuration and characterized in having a density at 23° of between 0.95 and 0.96, and in having a melt index in the range of 3 to 15 grams/10 minutes when extruded through a 2.1 mm. orifice at 190° C. under a 2.16 kilogram weight.

It is known that linear, relatively low density, high tensile strength polyethylenes having molecular weights as high as 3,000,000 can be produced by processes in which an organometallic compound and a transition metal halide are employed as catalysts to effect polymerization of the ethylene. In general, the ratio of the organometallic compound to transition metal halide compound is at least 30:1 with a ratio of about 50:1 being optimum. However, the ratio may be as high as 400:1.

The very high molecular weight polyethylenes produced by the described process, while having certain desirable properties, are characterized by a very low melt index on the order of 0.3 gram/10 minutes at 250° C. and 2,740 p.s.i. As a result, the polyethylenes have very poor plastic flow properties and are classified as unprocessable.

The present invention, in accordance with its major object, provides a method for increasing the plastic flow and therefore the processability of the described linear, high molecular weight polyethylenes without an attendant substantial decrease in the point at which the materials yield under an applied stress, such as yield strength and tensile strength.

A more specific object of the present invention is to produce a blend of polyethylenes, which blend is characterized by good extrudability and plastic flow properties and high mechanical strength, enabling the blend to compare favorably with the best commercially available pipe grades of polyethylene.

In one of its broader aspects, the present invention comprises blending a linear, high molecular weight, unprocessable polyethylene with certain specific types of linear, high density, high melt index polyethylenes in a relatively narrow range of blend proportions. The product blend displays good plastic flow and processability, yet is characterized by high tensile strength, high yield strength and an excellent stress cracking time. In many respects, the product blend is superior in its mechanical properties to the best commercially available pipe grades of polyethylene, and is characterized by a high melt index approximately equivalent to such pipe grade polyethylenes.

More specifically, the invention comprises the process of producing a novel polyethylene blend which comprises (a) from about 70 percent to 90 percent of a linear, relatively low density polyethylene having a molecular weight averaging about 1,000,000, a molded density at 23° C. of from about 0.925 to 0.935 and a modified melt index of about 0.30 gram/10 minutes at 250° C. at 2,740 p.s.i., and (b) from about 30 percent to about 10 percent of a linear polyethylene having a density between 0.95 and 0.96, a melt index in the range of 3 to 15 grams/10 minutes at 190 C. under a 2.16 kilogram weight, a tensile strength at yield (2 inches/minute crosshead speed) of from 3,000 to 4,500 p.s.i., and a tensile strength (2 inches/minute) at break of from 2,000 p.s.i. to 4,000 p.s.i. These properties of the minor component polyethylene appear to be critical to the achievement of the desired results of the process, and other polyethylenes which we have blended with the high molecular weight major component polyethylene either lack compatibility with the latter material, or do not impart the properties sought to the product blend. Branched chain, low density polyethylenes produced by high pressure polymerizaiton procedures are not operative in the process of the invention.

In blending the polyethylenes according to the process of the invention, I have used two techniques of mixing or blending, although other blending procedures may be used and will occur to those skilled in the art. In one instance, the two polyethylenes were dry mixed by mechanical means with satisfactory results. In the other blending method used, a xylene solution of the lower molecular weight second polyethylene was prepared, this deposited upon the ground particles of the very high molecular weight polyethylene, and the xylene then removed by evaporation. This method of blending is more difficult to pursue than the dry blending technique and also appears to give slightly less satisfactory results.

One of the most surprising and unexpected results achieved in the process of the present invention is the character of the blend which is produced by the process. The highly desirable mechanical strength properties of the very high molecular weight polyethylene component are not substantially lessened by the blending procedure, yet the melt index of the blend is considerably higher than that of the extremely high molecular weight polyethylene. The extrudability of the blend thus represents a vast improvement over that of the high molecular weight component of the blend. In fact, the blends made by the process of the present invention, though having a melt index comparable to the best commercially available pipe grades of polyethylene, are generally superior in yield strength and tensile strength to such commercial pipe grades.

As has been previously indicated, the types of polyethylenes which are used in practicing the process of the invention are of critical importance. One of the main objects of the invention has been stated to be that of modifying certain types of very high molecular weight, linear polyethylenes to improve the plastic flow and processability thereof without substantial decrease in the point at which these materials yield or break under an applied stress. In order to permit one to more fully understand and appreciate the invention, it is, therefore, desirable to more certainly define the extremely high molecular weight, linear polyethylenes which constitute one component of the invention.

These polyethylenes are produced by a process which employs an organometallic-transition metal halide polymerization catalyst in which the ratio of organometallic compound to transition metal halide is from 30 to 1 to 400 to 1 and preferably is between 40 to 1 and 60 to 1. The polymerization reaction is generally effected at a temperature of between 50° C. and 200° C. The pressure obtaining during the reaction is not critical and usually is determined only by the limitations of the equipment employed. The reaction time can also vary widely and is established primarily by the degree of conversion desired.

The properties of the high molecular weight polyethylenes used in the described process are unusual in several respects. The polyethylene, as has been stated, is characterized by a very high molecular weight, extreme linearity, relatively low density, high tensile strength, and extremely low melt index. The properties of this material are summarized in Table I.

TABLE I

| | |
|---|---|
| Molecular weight [1] | 800,000–3,000,000; average about 1,000,000. |
| Amorphous content [2] | 15–25%. |
| Crystallinity [2] | 75–85%. |
| Extent of branching [3] | Less than one methyl group per 1,000 carbon atoms. |
| Initial melting point [4] | 186° C.–220° C. |
| Remelt point [5] | 127° C.–135° C. |
| Unannealed tensile strength [6] | 5,000 p.s.i.–9,000 p.s.i. |
| Annealed tensile strength [6] | Over 9,000 p.s.i. |
| Elongation at break [7] | 200–300%. |
| Solubility | Substantially insoluble in hydrocarbon solvents. |
| Density @ 23° C.[8] | 0.925–0.935. |
| Resistance to stress cracking | Very high.[9] |
| Shore hardness [10] | 65. |
| Stiffnes in flexure [11] | 49,084 p.s.i. |
| Modified melt index | 0.30 gram/10 min. at 250° C. at 2,740 p.s.i. |
| Tensile stress at yield [12] | 2,990 p.s.i. |

[1] Estimated from attempted molecular weight determinations using intrinsic viscosity.

[2] X-ray Methods, see Mathews, J. L., Peisu, H. S., and Richards, R. B., Acta Crystallographica 2, 85 (1949), and Bryant, W. M. P., Tordella, J. P., and Pierce, K. H. H., Jr., Division of Paint, Plastics and Printing Ink Chemistry, 118th Meeting, ACS, Chicago, Ill. (1950).

[3] An infrared method, see W. D. M. Bryant and R. C. Voter, J. Am. Chem. Soc., 75, 6113 (1953).

[4] The granular polymer is observed through a microscope equipped with a hot stage using polarized light. The initial melting range is the temperature where birefringence of the particles starts to disappear and where it has completely disappeared.

[5] Same apparatus as used in ([3]). After the initial melting, the polymer is allowed to cool and crystallize. The remelt range is the beginning and end of disappearance of birefringence.

[6] ASTM D638-58-T 20 inches per minute crosshead.
[7] ASTM D638-58-T.
[8] ASTM D792-50.
[9] Using the Bell Test Method, no cracking was in evidence after 4,500 hours. The Bell Test Method is set forth in the ASTM Standards for Plastics (1958) at page 1049.
[10] ASTM D-676.
[11] ASTM D-747-50.
[12] ASTM D-638, crosshead speed, 1 inch per minute.

From the described properties it will be readily apparent that the high molecular weight polyethylenes which constitute one component of the blend of the present invention, while being characterized by excellent mechanical strength properties, are also characterized by a very low melt index. They thus demonstrate very poor plastic flow properties, being only difficultly extrudable, and, in general, being categorized as unprocessable.

In practicing the process of the present invention the described linear, high molecular weight, high tensile strength polyethylene is blended with certain types of polyethylenes which are also linear, are characterized by a density of between 0.95 and 0.96, and a melt index in the range of 3 to 15 grams/10 minutes at 190° C. under a 2.16 kilogram weight. The high molecular weight unprocessable polyethylene is blended with the second or modifying polyethylene in ratios of from 9:1 to about 33.3:1 or 10 to 30 percent by weight of the modifying polyethylene. Blends containing from about 15 to 25 percent by weight of the modifying polyethylene are preferred with about 20 percent by weight generally being the optimum.

Typical properties of several polyethylenes which I have found satisfactory for blending with the extremely high molecular weight polyethylene are tabulated in Table II.

TABLE II

| Property | Units | Polyethylene | | |
|---|---|---|---|---|
| | | A | B | C |
| Density at 23° C | Grams/cc | 0.960 | 0.953 | 0.950 |
| Melt Index | Grams/10 min | 3.5 | 9.0 | 15.0 |
| Tensile Yield Strength 2 inches/minute | P.s.i | 3,963 | 3,495 | 3,532 |
| Stress Cracking | Hours | 2 | | 1.5 |
| Tensile at Break 2 inches/minute | P.s.i | 2,242 | 2,104 | 2,133 |
| Elongation | Percent | 850 | 43 | 176 |
| Hardness, Shore D | | 68 | 63–70 | 73 |
| Stiffness Modulus | P.s.i | 150,000 | 110,000 | 115,000 |

As indicated hereinbefore, the method of blending the polyethylenes is not particularly important in the practice of the invention. In the examples of the practice of the invention which follow, two blending processes were used. In one of these, the powdered, dry, high molecular weight polyethylene was mixed mechanically with the second polyethylene which was also in dry powdered form. In the other mixing technique used, a xylene solution of the soluble polyethylene was prepared, the solution mixed with particles of the high molecular weight polyethylene, and the xylene then removed.

A number of blends of the two polyethylene types described have been prepared and the properties of these blends are summarized in Table IV. The properties of the specific high molecular weight, low melt index polyethylene used in the blends are set forth in Table III. The modifying polyethylenes used were those whose properties are described in Table II.

TABLE III.—PROPERTIES OF HIGH MOLECULAR WEIGHT POLYETHYLENE COMPONENT

| | Test Method Used | Result |
|---|---|---|
| Molded Density at 23° C | ASTM D-792-50 | 0.930. |
| Inherent Viscosity, dl./g | Tetralin, 130° C | 30.1. |
| Percent Ash | | 0.13. |
| Initial Melting Point | Disappearance-Birefringence. | 215–219° C. |
| Solidification Point | Appearance-Birefringence. | 122–120° C. |
| Remelt Point | Disappearance-Birefringence. | 128–131° C. |
| Bulk Density | ASTM D-1182-54 | 11.54 lbs./ft.[3]. |
| Tension Stress at Yield | ASTM D-638-1"/min | 2,900 p.s.i. |
| Tensile Strength at Break | ASTM D-412-20"/min | 6,400 p.s.i. |
| Percent Elongation | ASTM D-412-20"/min | 270. |
| Modified Melt Index | | 0.30 g./10 min. at 250° C. at 2,740 p.s.i. |
| Stiffness in Flexure | ASTM D-747-50 | 49,084 p.s.i. |
| Shore Hardness Scale D | ASTM D-676 | 65. |

The properties of two commercially available pipe grades of polyethylene are also set forth in Table IV so that the properties of the blends prepared by the process of the present invention may be compared with the former materials.

TABLE IV

|  | Percent by Weight | Blending Method | Yield Strength, 2"/min., p.s.i. | Tensile Strength, 2"/min., p.s.i. | Percent Elongation | Modified Melt Index 190° C. g./10 min. | Pressure, p.s.i. |
|---|---|---|---|---|---|---|---|
| Polyethylene from Table II Used: | | | | | | | |
| C | 15 | Dry | 3,234 | 4,000 | 133 | 1.6 | 1,200 |
| C | 20 | Xylene | 3,234 | 3,489 | 100 | 2.8 | 1,200 |
| C | 25 | Dry | 3,288 | 3,644 | 120 | 7.2 | 1,200 |
| B | 20 | Dry | 3,192 | 5,192 | 293 | 2.4 | 1,200 |
| B | 20 | Dry | | | | 3.8 | 1,200 |
| B | 20 | Xylene | 3,166 | 3,500 | 100 | 2.7 | 1,200 |
| B | 25 | Dry | 3,064 | 4,596 | 306 | 3.1 | 1,200 |
| A | 18 | Xylene | | | | 1.4 | 1,200 |
| A | 20 | Dry | 3,349 | 5,306 | 287 | 2.0 | 1,200 |
| A | 25 | Dry | | | | 2.7 | 1,200 |
| Commercially Available Pipe Grades: | | | | | | | |
| 1 | | | 2,920 | 4,755 | 700 | 2.3 | 1,500 |
| 2 | | | 3,400 | 2,470 | 200–700 | 2.2 | 1,000 |

All of the blends described in Table IV displayed environmental stress cracking times well in excess of 2,000 hours. Also all of the blends were extrudable and the majority of the blends produced an extrudate which was comparable in quality to commercially available pipe grades.

From the data tabulated in Table IV, it will be perceived that the novel blends prepared by the process of this invention are equal to, or in most cases superior to, the mechanical strength properties of several typical commercially available pipe grades. The melt index values and extrudability of the blends are at least as good as the corresponding properties of the commercially available pipe grades.

Having thus described the invention by providing specific examples thereof, it is to be understood that no undue limitations or restrictions are to be drawn by reason thereof, and that many variations and modifications are within the scope of the invention.

What is claimed is:

1. A process for increasing the plastic flow and processability of a linear high molecular weight, difficultly processable, low melt index polyethylene characterized by having a density from about 0.925 to 0.935 gram/cc. at 23° C., a melt index of about 0.30 gram/10 minutes extruded through a 2.1 mm. orifice at 250° C. and under a pressure of 2,740 p.s.i., an unannealed tensile strength of from 5,000 p.s.i. to 9,000 p.s.i., and a molecular weight in the range of 750,000 to 3,000,000, without substantial decrease in yield point to applied stress which comprises blending with said high molecular weight, difficultly processable polyethylene, between 10 percent and 30 percent by weight of a second polyethylene of straight hydrocarbon chain configuration and characterized as having a density of between 0.95 gram/cc. and 0.95 gram/cc. at 23° C., and in having a melt index in the range of 3 to 15 grams/10 minutes extruded through a 2.1 mm. orifice at 190° C. under a 2.16 kilogram weight.

2. The process claimed in claim 1 wherein said second polyethylene is further characterized as having a tensile yield strength of between 3,000 p.s.i. and 4,500 p.s.i., a tensile strength at break of from 1,500 p.s.i. to 5,000 p.s.i., a Shore "D" scale hardness of between 63 and 73, and a stiffness of between approximately 110,000 p.s.i. and 150,000 p.s.i.

3. The process claimed in claim 1 wherein said second polyethylene is characterized by the following properties:

| | |
|---|---|
| Density at 23° C. _____gram/cc__ | 0.960 |
| Melt index _____grams/10 min__ | 3.5 |
| Tensile yield strength, 2 inches/minute __p.s.i__ | 3,963 |
| Stress cracking _____hours__ | 2 |
| Tensile strength at break, 2 inches/minute __p.s.i__ | 3,242 |
| Elongation _____percent__ | 850 |
| Hardness, Shore "D" scale _____ | 68 |
| Stiffness modulus _____p.s.i__ | 150,000 |

4. The process claimed in claim 1 wherein said second polyethylene is characterized by the following properties:

| | |
|---|---|
| Density at 23° C. _____gram/cc__ | 0.953 |
| Melt index _____grams/10 min__ | 9.0 |
| Tensile yield strength, 2 inches/minute __p.s.i__ | 3,495 |
| Tensile strength at break, 2 inches/minute __p.s.i__ | 2,104 |
| Elongation _____percent__ | 43 |
| Hardness, Shore "D" scale _____ | 63–70 |
| Stiffness modulus _____p.s.i__ | 110,000 |

5. The process claimed in claim 1 wherein said second polyethylene is characterized by the following properties:

| | |
|---|---|
| Density at 23° C. _____gram/cc__ | 0.950 |
| Melt index _____grams/10 min__ | 15 |
| Tensile yield strength, 2 inches/minute __p.s.i__ | 3,532 |
| Tensile strength at break, 2 inches/minute __p.s.i__ | 2,133 |
| Stress cracking _____hours__ | 1.5 |
| Elongation _____percent__ | 176 |
| Hardness, Shore "D" scale _____ | 73 |
| Stiffness modulus _____p.s.i__ | 115,000 |

6. A homogeneous, easily processable polyethylene composition comprising a blend of (a) from 15 percent to 25 percent by weight of a straight chain polyethylene characterized as having a density of from 0.95 gram/cc. to 0.96 gram/cc. at 23° C. and in having a melt index in the range of 3 to 15 grams/10 minutes through a 2.1 mm. orifice at 190° C. and under a 2.16 kilogram weight; and (b) from 85 percent to 75 percent of a linear polyethylene having an average molecular weight exceeding 750,000 and characterized as having a density of between approximately 0.925 gram/cc. and 0.935 gram/cc. at 23° C., a melt index of about 0.30 gram/10 minutes at 250° C. and 2,740 p.s.i., and an initial melting point of between 186° C. and 220° C.

7. A polyethylene composition as claimed in claim 6 wherein said composition is characterized by the following properties:

| | |
|---|---|
| Tensile yield strength, 2 inches/minute _____p.s.i__ | 3,000 to 3,500 |
| Tensile strength at break, 2 inches/minute _____p.s.i__ | 3,000 to 5,500 |
| Elongation _____percent__ | 100 to 310 |
| Modified melt index, grams/10 minutes at 190° C. and 1,200 p.s.i. _____ | 1.4 to 7.2 |

References Cited
UNITED STATES PATENTS

| | | | |
|---|---|---|---|
| 2,983,704 | 5/1961 | Roedel | 260—897 |
| 3,061,882 | 11/1962 | Wolinski | 260—897 |
| 3,086,958 | 4/1963 | Canterino et al. | 260—897 |
| 3,088,848 | 5/1963 | Tritsch | 260—897 |
| 3,125,548 | 3/1964 | Anderson | 260—897 |
| 3,179,719 | 4/1965 | Cines | 260—897 |

MURRAY TILLMAN, *Primary Examiner.*

DONALD E. CZAJA, *Examiner.*

J. A. KOLASCH, T. G. FIELD, *Assistant Examiners.*

UNITED STATES PATENT OFFICE
CERTIFICATE OF CORRECTION

Patent No. 3,340,328            September 5, 1967

Gordon D. Brindell et al.

It is hereby certified that error appears in the above numbered patent requiring correction and that the said Letters Patent should read as corrected below.

Column 5, line 65, for "0.95", second occurrence, read -- 0.96 --.

Signed and sealed this 1st day of October 1968.

(SEAL)
Attest:

Edward M. Fletcher, Jr.            EDWARD J. BRENNER

Attesting Officer            Commissioner of Patents